US008117117B2

(12) United States Patent
Hu et al.

(10) Patent No.: US 8,117,117 B2
(45) Date of Patent: *Feb. 14, 2012

(54) LOAN ORIGINATION SYSTEM INTERFACE FOR ONLINE LOAN APPLICATION PROCESSING

(75) Inventors: Limin Hu, Fremont, CA (US); Babak Khanpour, West Hills, CA (US)

(73) Assignee: Ellie Mae, Inc., Pleasanton, CA (US)

( * ) Notice: Subject to any disclaimer, the term of this patent is extended or adjusted under 35 U.S.C. 154(b) by 720 days.

This patent is subject to a terminal disclaimer.

(21) Appl. No.: 12/273,325

(22) Filed: Nov. 18, 2008

(65) Prior Publication Data

US 2009/0083173 A1   Mar. 26, 2009

Related U.S. Application Data

(63) Continuation of application No. 10/222,637, filed on Aug. 15, 2002, now Pat. No. 7,472,089.

(51) Int. Cl.
    *G06Q 40/00* (2006.01)

(52) U.S. Cl. ........................................... 705/38

(58) Field of Classification Search ............... 705/38–41
    See application file for complete search history.

(56) References Cited

U.S. PATENT DOCUMENTS

| 5,091,868 A | 2/1992 | Pickens et al. |
| 5,111,185 A | 5/1992 | Kozaki |
| 5,144,693 A | 9/1992 | Morgan |
| 5,148,520 A | 9/1992 | Morgan |
| 5,191,525 A | 3/1993 | LeBrun et al. |
| 5,226,137 A | 7/1993 | Bolan et al. |
| 5,438,657 A | 8/1995 | Nakatani |
| 5,581,700 A | 12/1996 | Witte |
| 5,611,052 A | 3/1997 | Dykstra et al. |
| 5,699,527 A | 12/1997 | Davidson |
| 5,704,029 A | 12/1997 | Wright, Jr. |
| 5,734,898 A | 3/1998 | He |
| 5,752,042 A | 5/1998 | Cole et al. |
| 5,765,144 A | 6/1998 | Larche et al. |
| 5,768,510 A | 6/1998 | Gish |
| 5,774,551 A | 6/1998 | Wu et al. |
| 5,812,764 A | 9/1998 | Heinz, Sr. |

(Continued)

FOREIGN PATENT DOCUMENTS

WO    WO 00/21011    4/2000

OTHER PUBLICATIONS

Calyx Point—Getting Started (Updated Aug. 2002).

(Continued)

*Primary Examiner* — Hani M Kazimi
(74) *Attorney, Agent, or Firm* — Fish & Richardson P.C.

(57) ABSTRACT

A loan origination system interface module, methods and computer program products. One computer program product for processing loan application data including instructions to extract loan application data including retrieving identification information for a loan application associated the loan application data from a broker device and displaying on the broker device a list of loan applications available to process in an interface that is consistent with a loan origination computer program associated with the broker device. In response to command input from the broker device selecting a loan application from the list of loan applications, the computer program product includes instructions to reformat loan application data for the selected loan application to a format compatible with that required by a lender device and transmit reformatted loan application data to a lender device.

31 Claims, 9 Drawing Sheets

U.S. PATENT DOCUMENTS

| | | | |
|---|---|---|---|
| 5,913,029 A | 6/1999 | Shostak |
| 5,919,247 A | 7/1999 | Van Hoff et al. |
| 5,940,812 A | 8/1999 | Tengel et al. |
| 5,963,952 A | 10/1999 | Smith |
| 5,995,947 A | 11/1999 | Fraser et al. |
| 5,995,985 A | 11/1999 | Cai |
| 6,000,033 A | 12/1999 | Kelley et al. |
| 6,006,242 A | 12/1999 | Poole et al. |
| 6,006,334 A | 12/1999 | Nguyen et al. |
| 6,023,714 A | 2/2000 | Hill et al. |
| 6,029,149 A | 2/2000 | Dykstra et al. |
| 6,078,403 A | 6/2000 | Palmer |
| 6,081,893 A | 6/2000 | Grawrock et al. |
| 6,088,700 A | 7/2000 | Larsen et al. |
| 6,088,796 A | 7/2000 | Cianfrocca et al. |
| 6,092,121 A | 7/2000 | Bennett et al. |
| 6,101,510 A | 8/2000 | Stone et al. |
| 6,104,394 A | 8/2000 | Lisle et al. |
| 6,128,602 A | 10/2000 | Northington et al. |
| 6,154,751 A | 11/2000 | Ault et al. |
| 6,157,953 A | 12/2000 | Chang et al. |
| 6,175,926 B1 | 1/2001 | Fogle |
| 6,202,206 B1 | 3/2001 | Dean et al. |
| 6,208,979 B1 | 3/2001 | Sinclair |
| 6,209,095 B1 | 3/2001 | Anderson et al. |
| 6,226,623 B1 | 5/2001 | Schein et al. |
| 6,233,566 B1 | 5/2001 | Levine et al. |
| 6,233,582 B1 | 5/2001 | Traversat et al. |
| 6,266,716 B1 | 7/2001 | Wilson et al. |
| 6,282,658 B2 | 8/2001 | French et al. |
| 6,321,339 B1 | 11/2001 | French et al. |
| 6,324,524 B1 | 11/2001 | Lent et al. |
| 6,324,648 B1 | 11/2001 | Grantges, Jr. |
| 6,336,124 B1 | 1/2002 | Alam et al. |
| 6,338,064 B1 | 1/2002 | Ault et al. |
| 6,339,828 B1 | 1/2002 | Grawrock et al. |
| 6,341,351 B1 | 1/2002 | Muralidhran et al. |
| 6,351,776 B1 | 2/2002 | O'Brien et al. |
| 6,363,391 B1 | 3/2002 | Rosensteel, Jr. |
| 6,366,912 B1 | 4/2002 | Wallent et al. |
| 6,385,655 B1 | 5/2002 | Smith et al. |
| 6,397,337 B1 | 5/2002 | Garrett et al. |
| 6,418,448 B1 | 7/2002 | Sarkar |
| 6,424,968 B1 | 7/2002 | Broster et al. |
| 6,438,526 B1 | 8/2002 | Dykes et al. |
| 6,446,141 B1 | 9/2002 | Nolan et al. |
| 6,469,714 B2 | 10/2002 | Buxton et al. |
| 6,473,892 B1 | 10/2002 | Porter |
| 6,476,828 B1 | 11/2002 | Burkett et al. |
| 6,476,833 B1 | 11/2002 | Moshfeghi |
| 6,477,537 B2 | 11/2002 | Gustman |
| 6,493,871 B1 | 12/2002 | Welch et al. |
| 6,496,936 B1 | 12/2002 | French et al. |
| 6,504,554 B1 | 1/2003 | Stone et al. |
| 6,538,669 B1 | 3/2003 | Lagueux, Jr. et al. |
| 6,553,408 B1 | 4/2003 | Merrell et al. |
| 6,608,634 B1 | 8/2003 | Sherrard et al. |
| 6,611,816 B2 | 8/2003 | Lebda et al. |
| 6,615,405 B1 | 9/2003 | Goldman et al. |
| 6,640,278 B1 | 10/2003 | Nolan et al. |
| 6,662,340 B2 | 12/2003 | Rawat et al. |
| 6,851,087 B1 | 2/2005 | Sibert |
| 6,859,878 B1 | 2/2005 | Kerr et al. |
| 6,904,412 B1 | 6/2005 | Broadbent et al. |
| 6,920,434 B1 | 7/2005 | Cossette |
| 6,947,943 B2 | 9/2005 | DeAnna et al. |
| 7,058,971 B1 | 6/2006 | Horikiri |
| 7,103,650 B1 | 9/2006 | Vetrivelkumaran et al. |
| 7,155,490 B1 | 12/2006 | Malmer et al. |
| 7,165,250 B2 | 1/2007 | Lyons |
| 7,185,333 B1 | 2/2007 | Shafron |
| 7,263,663 B2 | 8/2007 | Ballard et al. |
| 7,340,714 B2 | 3/2008 | Upton |
| 7,343,348 B2 | 3/2008 | McAvoy et al. |
| 7,379,965 B2 | 5/2008 | Sherwood et al. |
| 2001/0010046 A1 | 7/2001 | Muyres et al. |
| 2001/0011246 A1 | 8/2001 | Tammaro |
| 2001/0029482 A1 | 10/2001 | Tealdi et al. |
| 2001/0032178 A1 | 10/2001 | Adams et al. |
| 2001/0037288 A1 | 11/2001 | Bennett et al. |
| 2001/0039516 A1 | 11/2001 | Bennett et al. |
| 2001/0047307 A1 | 11/2001 | Bennett et al. |
| 2001/0047326 A1 | 11/2001 | Broadbent et al. |
| 2001/0049653 A1 | 12/2001 | Sheets |
| 2002/0019804 A1 | 2/2002 | Sutton |
| 2002/0029188 A1 | 3/2002 | Schmid |
| 2002/0059137 A1 | 5/2002 | Freeman et al. |
| 2002/0065879 A1 | 5/2002 | Ambrose et al. |
| 2002/0138414 A1 | 9/2002 | Baker, IV |
| 2002/0188941 A1 | 12/2002 | Cicciarelli et al. |
| 2002/0194219 A1 | 12/2002 | Bradley et al. |
| 2003/0033241 A1 | 2/2003 | Harari |
| 2003/0046586 A1 | 3/2003 | Bheemarasetti et al. |
| 2003/0061398 A1 | 3/2003 | Wilson et al. |
| 2003/0065614 A1 | 4/2003 | Sweeney |
| 2003/0066065 A1 | 4/2003 | Larkin |
| 2003/0159136 A1 | 8/2003 | Huang et al. |
| 2003/0163598 A1 | 8/2003 | Wilson et al. |
| 2003/0184585 A1 | 10/2003 | Xu et al. |
| 2003/0210428 A1 | 11/2003 | Bevlin et al. |
| 2003/0229581 A1 | 12/2003 | Green et al. |
| 2003/0233316 A1 | 12/2003 | Hu et al. |
| 2004/0019558 A1 | 1/2004 | McDonald et al. |
| 2004/0034592 A1 | 2/2004 | Hu et al. |
| 2004/0088700 A1 | 5/2004 | Lee et al. |
| 2004/0138996 A1 | 7/2004 | Bettenburg et al. |
| 2004/0225596 A1 | 11/2004 | Kemper et al. |
| 2005/0172271 A1 | 8/2005 | Spertus et al. |
| 2005/0235202 A1 | 10/2005 | Chen et al. |
| 2005/0278249 A1 | 12/2005 | Jones et al. |
| 2005/0289046 A1 | 12/2005 | Conyack, Jr. |
| 2006/0005036 A1 | 1/2006 | Hu et al. |
| 2006/0075070 A1 | 4/2006 | Merissert-Coffinieres et al. |
| 2006/0101453 A1 | 5/2006 | Burkhart et al. |
| 2006/0155639 A1 | 7/2006 | Lynch et al. |
| 2006/0178983 A1 | 8/2006 | Nice et al. |
| 2006/0184452 A1 | 8/2006 | Barnes et al. |
| 2006/0248003 A1 | 11/2006 | Basin et al. |

OTHER PUBLICATIONS

Gator eWallet—The Smart Online Companion, Feb. 24, 2006 (2 pages). Retrieved from the Internet: URL:http://www.gator.com/home2.html.

Gator eWallet—Frequently Asked Questions, Feb. 24, 2006 (11 pages). Retrieved from the Internet: URL:http://www.gator.com/help/gatorfaq.html.

Point Installation (PN 801000-000737) (2 pages).

Contour Software, Inc.—The Loan Closer for Windows—Version 4.0 (1984-1998).

Contour Software, Inc.—The Loan Handler—Version 5.0 (1984-2001).

Ilium Software eWallet Users Guide and Reference Version 4.0 by Ilium Software, Inc. © 1997-2006.

Calyx Software, "Point for Windows Version 3.x Interface Development Guide," Nov. 29, 1999, pp. 1-21.

Calyx Software, "Point for Windows Version 3.x Interface Marketing Guide," Dec. 8, 1999, pp. 1-5.

LOS Documentation—Genesis (2001).

LOS Documentation—Calyx (2002).

Calyx Point—Getting Started (2002).

Calyx Point—Point User Guide (2002).

LOS Documentation—Byte (2003).

Calyx Point—Point User Guide (2003).

Calyx Point and PointMan—Getting Started Guide (2003).

LOS Documentation—Genesis (2004).

Understanding Client-Server Applications, Parts I and II, zone.ni.com, Feb. 19, 2004.

A Gentle Introduction to SGML, isgmlug.org, Apr. 14, 2004.

Overview of SGML Resources, W3.org., Apr. 14, 2004.

Application Service Provider, Webopedia, May 6, 2004.

How ASPs Work, howstuffworks.com, Jul. 1, 2004.

Defining an Internet ASP, howstuffworks.com, Jul. 1, 2004.

Examples of ASPs, howstuffworks.com, Jul. 1, 2004.

How ASPs Work, Things to Ask a Prospective ASP, howstuffworks.com, Jul. 1, 2004.

User's Guide to Gator eWallet Version 7.x, published by Gain Publishing (no publication date known).

Using MS Message Queue Triggers, Bradley Holland, consulting.dthomas.co.uk, date unknown.

Mguill, "Genesis 2000 TechNet" Internet Publication, (Online) Jan. 28, 2003. Retrieved from the Internet: URL:http://www.genesis2000.com/support/index3.asp.

FIG. 3B

INDY MAC BANK

HOME | RATES & INDICES | PARTNERS HELP | BUSINESS SERVICES     SUPPORT | PRODUCTS | UPDATE

DESKTOP HOME
LOG OFF

QUICK PRICER
- NEW QUICKPRICE
- IMPORT FROM CALYX POINT  ← 302
- IMPORT FROM GENESIS
- IMPORT FROM CONTOUR
- QUICKPRICER PIPELINE

LOS
- SUBMIT NEW LOANS
- IMPORT FROM CALYX POINT  ← 304
- IMPORT FROM GENESIS
- IMPORT FROM CONTOUR
- IMPORT FROM OTHER LOS
- VIEW DECISION
- LOAN SEARCH

SUBMIT LOANS

LOAN APPLICATION | PAGE 1 | UNDERWRITING AND TRANSMITTAL SUMMARY | SUMMARY ← 305

BORROWER

| | |
|---|---|
| MY LOAN NUMBER: | LOAN NUMBER |
| DOC TYPE: | NO DOC |
| NUMBER OF BORROWERS: | TWO |
| TEMPORARY BUYDOWN: | NO |
| CONSTRUCTION OR REMODEL LOAN: | NO |
| LIEN POSITION: | FIRST |

TYPE OF MORTGAGE AND TERM OF LOAN

| | |
|---|---|
| LOAN/LINE AMOUNT: | 250000 |
| PRODUCT: | FIXED 30 |
| REQUEST PRICE: | ○ |
| INTEREST RATE: | ● |
| INTEREST RATE %: | 6.375 |
| LOAN PROGRAM: | BEST EXECUTION |

PROPERTY INFO AND PURPOSE OF LOAN

| | |
|---|---|
| ADDRESS: | 123 MAIN STREET, WA |
| LOAN PURPOSE: | PURCHASE |
| OCCUPANCY: | PRIMARY RESIDEN |
| ESTATE HELD IN: | FEE SIMPLE |
| NUMBER OF YEARS...: | 10 OR MORE |
| PRIMARY RESIDENCES...: | 0 |

300

LOAN ORIGINATION SYSTEM INTERFACE FOR ONLINE LOAN APPLICATION PROCESSING

CROSS-REFERENCE

This application is a continuation of U.S. application Ser. No. 10/222,637, entitled "Loan Origination System Interface for Online Loan Application Processing," filed on Aug. 15, 2002; and is related to U.S. application Ser. No. 10/172,844, entitled "Online System for Fulfilling Loan Applications from Loan Originators," filed on Jun. 14, 2002. The disclosures of said applications are incorporated herein by reference.

FIELD OF THE INVENTION

The present invention relates generally to computer networks, and more specifically, to a web-based interface between lenders and loan brokers using loan origination system software.

BACKGROUND

The World Wide Web ("web") has evolved from first generation web systems that simply provided information to client computers over the Internet through a web browser program, to second generation systems using application servers that provide dynamic, personalized information and powerful back-end transaction processing.

A great number of commercial applications have become adapted to on-line systems, thus establishing a base of many different types of electronic commerce or "e-commerce" transactions. One traditional commercial transaction type that has become adapted to online implementations is that of financial loans. The loan application process is often a complicated and confusing process for average borrowers. There are a great many different types of loans available depending upon the type of loan required, such as personal loans, home mortgages, business lines of credit, and so on. There are also many different variables or negotiable terms associated with each loan, such as interest rate, loan period, and the like. In most cases, a detailed profile of the borrower is required because factors such as age, employment, financial history, credit rating and so on, can have a great deal of impact on the cost or even qualification for a loan. Moreover, loans are available from many different sources, such as traditional banks to private and commercial money lenders.

Thus, the process of applying for and obtaining a loan can be complicated and time consuming because of the great number of variables regarding the loan, the lender, and the borrower, as well as the number of parties involved in the loan process. Because of the distributed information-intensive nature of the loan industry, a class of loan brokers, often referred to as "loan originators" or "loan origination services" has emerged to aid borrowers in finding and obtaining the proper loan. The advent of loan originators has served to provide an important interface between borrowers and the various lenders who might have an appropriate loan product.

The widespread use of the Internet has generally led loan originators to recognize and accept the Internet and computerized processes as viable and promising vehicles with which to conduct business. Traditional loan processing involves a great deal of customer support, data input, and expedited mailing and delivery of physical documents. These factors present areas of great cost and potential problems in the loan application, processing, and delivery transaction. Although most present loan originators have implemented software systems to automate their processes, typical loan origination systems (LOS) do not provide a comprehensive interface between borrowers and lenders. Furthermore, most present loan origination systems do not provide comprehensive form and document completion process that truly automates the loan application process and minimizes the errors associated with individually completing all of the separate forms required in a typical loan transaction. A further disadvantage associated with present on-line implemented loan application systems is the typically complex loan file export and manual form population process that is required on the lender and loan origination vendor web sites.

Although comprehensive software systems have been developed to integrate lender, broker, and third party vendors within Internet-based loan application and fulfillment networks, such systems often involve extensive interfacing or customization of each party's computer networks. For example, present systems typically require that each individual lenders or third parties install application interfaces or custom components that render their network portal computers compatible with certain specific broker computer systems or commercially available loan origination system program. Such a requirement is often burdensome to the lenders and third parties. These systems also present potential sources of problems, and can often require redundant storage or transmission of existing data.

What is needed, therefore, is a loan processing system that provides an efficient interface between lender computers and broker computers that accesses data and resources already available on the broker computer system.

What is further needed is a web-based interface that transfers data from a lender computer network to a broker network without requiring the lender to install extensive programs or program interfaces.

SUMMARY

A web-based loan origination system interface for on-line lenders and loan brokers is described. Data comprising borrower and loan product information is stored in data storage accessible to a loan origination system program. The loan origination system and a web browser process are executed by a loan broker computer. A lender computer coupled to the loan broker computer executes a web server process and a module that serves to access data from the loan origination system program. The loan originator accesses the lender web site to perform loan processing procedures. The module is included on the lender's web site as a reference link. The module contains information unique to the lender, such as the lender's identification number and the lender's desired data format. Once the loan originator decides to transfer a loan application or supplemental data to the lender, the module examines the loan origination software pipeline and presents it to the loan originator. When the loan originator selects an action to be performed, the module extracts loan information stored in the loan origination software by conducting a search for each required data field, relates that data to the specific field in the vendor application format, and packages the data in a format acceptable to the lender. The module then finds the appropriate route to deliver the loan data to the lender, either directly through a standard Internet secure communication protocol, or indirectly through a separate server computer. The loan originator can then continue the transaction on the lender's web site in an uninterrupted work flow. Loan processing occurs on the lender's web site, and the interaction of the web site and loan origination software is handled by the module.

In one embodiment, the loan origination system interface is implemented in a computer network that comprises a processing and submission system that receives relevant loan information from a borrower and enters this information into file templates, which are utilized during loan origination. An automatic data flow process accessible through an origination screen populates the relevant fields in all of the other loan forms and word processing documents. Forms are supported for several different loan types, such as conventional mortgages, federal housing authority loans, veterans administration loans, and other similar types of personal and business loans. The automatic data flow eliminates the need to re-enter the same information in each form, and it also automatically calculates relevant field data, such as percentage rate, maximum loan, cash to or from borrower, amortization schedules, and the like. Once information is entered into each data field, e.g., name and address, of the file template during the loan origination process, the information is saved in a database wherein each data field is associated with the particular information entered. When a particular loan form is activated, the automatic data flow program conducts a search for each data field. Alternatively, each loan form can be modified to insert embedded codes, so that the computer program can more easily identify the location of a data field and enter the associated information.

Other objects, features, and advantages of the present invention will be apparent from the accompanying drawings and from the detailed description that follows below.

DESCRIPTION OF DRAWINGS

The present invention is illustrated by way of example and not limitation in the figures of the accompanying drawings, in which like references indicate similar elements, and in which:

FIG. 3B is an exemplary web page for a loan submission through a lender computer, according to one embodiment of the present invention;

DETAILED DESCRIPTION

Figure 1A:
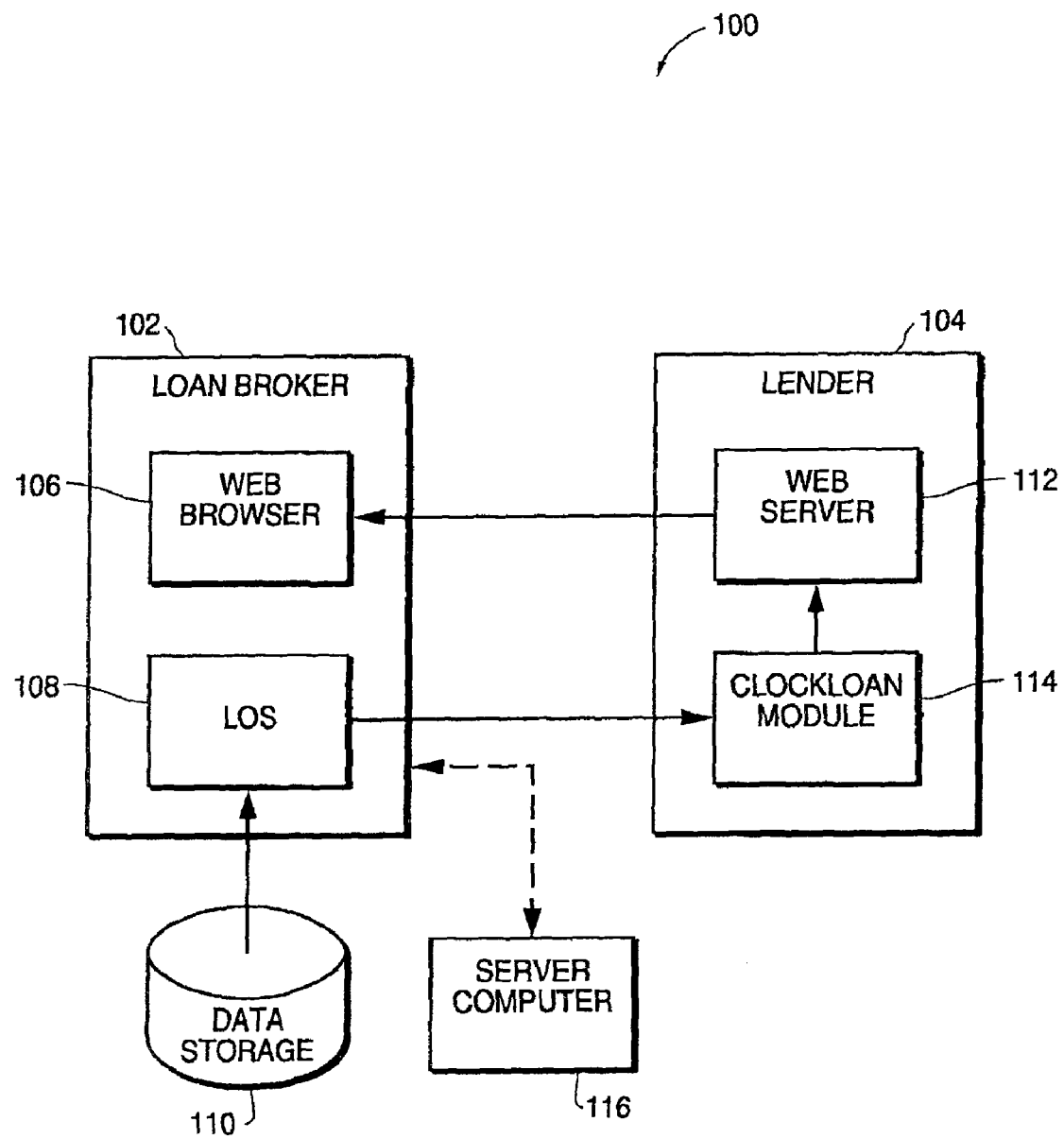
FIG. 1A illustrates a network that implements a web-based loan origination system interface between a loan broker web client and a lender web server, according to one embodiment of the present invention.

A web-based loan origination system interface for brokers and lenders computer networks is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or a fiber or copper-based telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, or any other similar type of computing device.

In the loan application process, a broker matches a borrower (customer) with the loan package that best suits their need. Unlike the retail loan market, in which the borrower directly inquires about loans available from a bank or commercial lender, the loan broker utilizes the wholesale loan market. In terms of a general process, the broker obtains data from the borrower and then shops for loans from the available sources in the wholesale loan market. Wholesale lenders typically work only with brokers, and take completed loan packages and underwrite them. The brokers are typically offered discounted pricing in return for the processing work performed by the broker.

In a network embodiment of the present invention, a loan broker computer is configured to access computers operated by third parties (typically in the wholesale loan market), such as lenders, loan underwriters, settlement service vendors, and other similar loan fulfillment parties through a web-based interface that is integrated with a loan origination software program. The loan broker provides an on-line interface between borrowers, and those companies that will ultimately perform the loan services and provide the requested funds. During the course of the loan application process, various items of information are transmitted among the parties, including borrower information and loan application data. This information is typically maintained in databases stored in the broker computer, or on the third party computers. Different entities may be responsible for different aspects of the transaction from the lender's side. For example, one company may be involved in the processing of a loan application, while another is involved with providing the loan itself, while yet another may be involved with the billing and collection of repayment from the borrower.

The network implementation facilitates the delivery (transmission) and tracking of data and allows for the completion of electronic commerce transactions. Several different network topologies may be implemented through the use of a loan processing network system according to embodiments of the present invention. In general, the network system couples one or more lenders (banks, financial institutions, credit agencies, and so on) to the loan brokers who act on behalf of potential borrowers. The loan brokers help borrowers to find and obtain loans by obtaining personal data from the borrower, searching for compatible loans from the various lenders, presenting loan selections to the borrower, and performing certain validation or screening tasks, such as pre-qualification of the borrower. The loan brokers also directly interface with the parties that will fulfill the loan or provide settlement services, such as lenders, loan underwriters, and settlement service vendors.

A broker typically keeps track of pending loans and customers through one or more pipelines. A pipeline generally refers to a list of all loans or loan applications and/or borrowers that are committed and being processed by the broker. A separate pipeline, often referred to as a "pre-qualification pipeline" can be used to list prospective loans and/or borrowers who are not yet committed to a particular loan.

For purposes of the present discussion, a lender can be any kind of wholesale lender, retail lender, correspondent lender, or other type of financial institution that lends money. A loan originator is any person or entity that helps to procure a loan from a lender on behalf of a borrower, and can include loan brokers, loan officers, loan processors, correspondent brokers, small banks that provide brokerage services, and any other similar type of loan procurement company or personnel. As used herein, the term "loan broker" is used to represent any such type of loan originator.

Loan brokers typically execute Loan Origination Software (LOS) programs to manage the origination tasks in the loan application process for a borrower. In one embodiment of the present invention, a processing and submission system is embedded in the broker computer system and is closely coupled to or integrated within the loan origination system program on the broker desktop. This integration serves to streamline the loan submission process and provides seamless connectivity to lenders and settlement service vendors over the network. The processing and submission system provides a direct interface to the loan origination system programs and allows efficient management and transmission of file data present in the broker loan origination software to the lender and vendor computer systems. The processing and submission system thus provides a centralized and comprehensive system for compiling the loan and borrower information, populating the loan documents with the relevant data, and submitting the completed documents to the appropriate lender and other third parties for review. This allows the broker to capture the borrower data once and publish this data to multiple lenders without having to repeatedly enter the borrower data for each loan application.

With the advent of the Internet, there has arisen a prevalence of web-based client/server networks involving the transmission of data through web pages served on server web sites accessed by client computers. Embodiments of the present invention include web-based interfaces and data transmission routines that facilitate the processing of loan applications between loan originators (brokers) and lenders over the Internet. FIG. 1A illustrates a network that implements a web-based loan origination system interface between a loan broker web client and a lender web server, according to one embodiment of the present invention. In system 100, a loan broker computer 102 executes a web browser program (such as Microsoft Explorer™ or Netscape Navigator™) 106 that accesses a web page served by a web server process 112 executed on a lender computer 104. The loan broker computer 102 also executes one or more loan origination system (LOS) programs 108. The loan origination software program 108 utilized by the loan broker can be a proprietary system or a commercially available system. Examples of present commercially available loan origination system programs include Genesis™, Contour™, Calyx Point™, and Byte™ among other similar LOS programs.

As shown in FIG. 1A, the lender 104 maintains a web site through web server process 112 that provides access for brokers and other loan originators to the various resources and products available from the lender. This allows loan originators and other users to access the lenders web site through a standard web browser interface. A loan origination system program interface, referred to herein as the "clickloan module" 114 is integrated into the lender web site through a web-based plug-in interface to web server process 112. The clickloan module 114 interfaces with the loan origination system software that is executed by the loan broker computer 102. The clickloan module 114 automatically identifies and transfers a loan application or its required information directly from the loan origination system program 108 to the lender web site with a minimum number of user operations, e.g., typewritten commands or mouse clicks. This process eliminates the need for the user (broker) to transfer the loan application and the relevant data directly to the lender computer. Data comprising borrower and/or loan information is stored in a data storage 110 that is closely or remotely coupled to the loan broker computer 102 through the loan origination system program 108.

The clickloan module 114 stores and processes information regarding the lender loan products, as well as account and network identification. Access to the clickloan module is typically provided by means of a hypertext link, or similar command mechanism, displayed on the lender's web page.

Upon execution, the clickloan module provides the relevant lender information, and accesses the loan application and borrower data from the data source 110 through the loan origination system 108. This information is then formatted and displayed to the broker through the lender web page and displayed using the web browser 106 on the broker computer 102. In this manner, data that is resident on the broker computer is used to build the information requested by the user. This mechanism eliminates typical complex loan file export functions and form population operations involved in most present on-line loan application systems.

Although not shown in FIG. 1A, either or both of the loan broker computer 102 and the lender computer 104 can be directly or indirectly coupled to computers operated by other relevant parties, such as loan underwriters, settlement service vendors, or other third parties that perform the function of fulfilling and settling the loan application. A separate server computer 116 may be used to download one or more program components to the loan broker computer 102 for use by the loan origination system program 108 and/or the clickloan module 114.

Figure 1B:
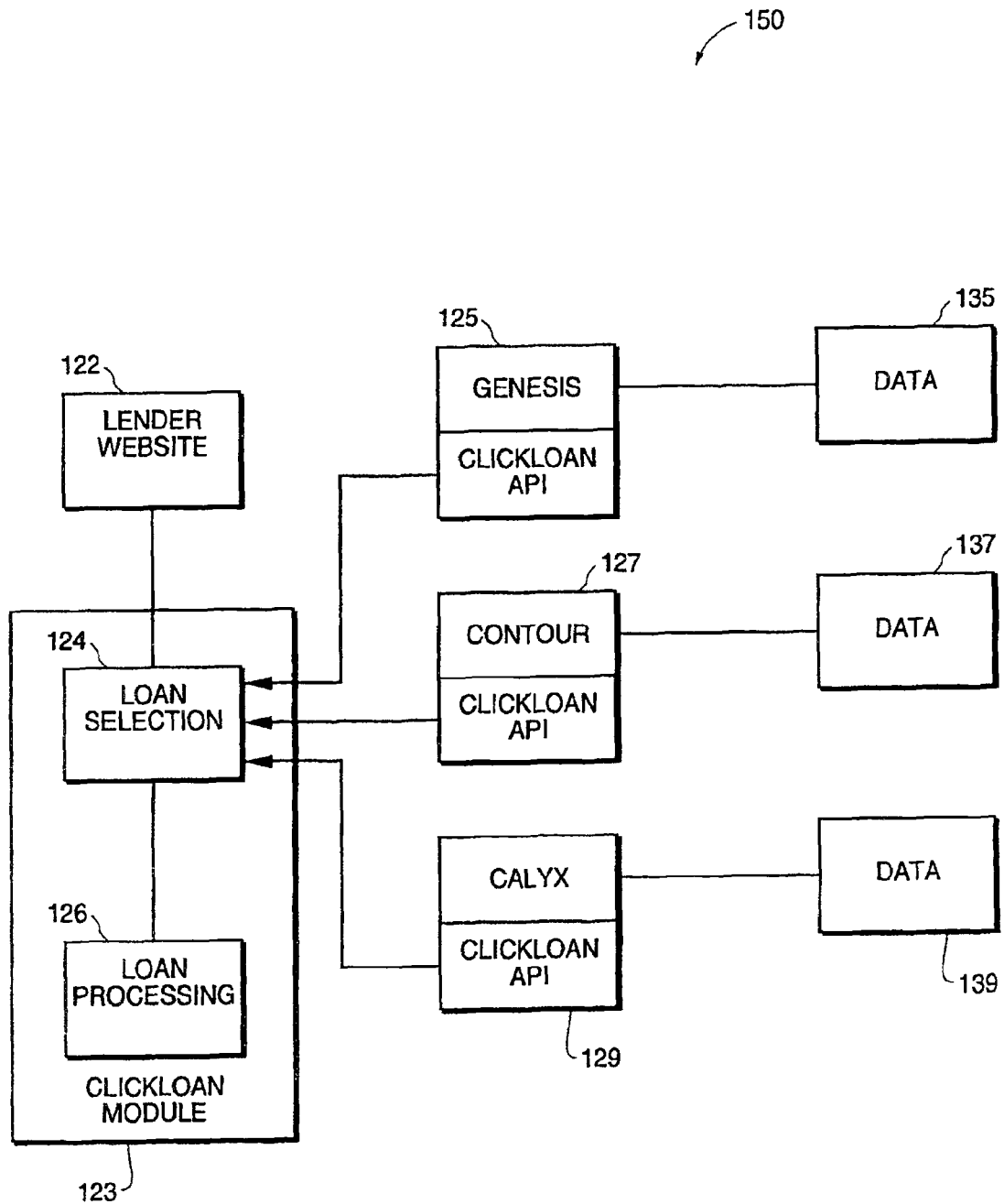
FIG. 1B illustrates the interface between the loan processing software system and one or more loan origination systems, according to one embodiment of the present invention.

FIG. 1B illustrates the interface between the embedded clickloan module and one or more loan origination systems, according to one embodiment of the present invention. The clickloan module 123 is closely coupled to the lender web site 122. The clickloan module 123 includes a loan selection sub-module 124 and a loan processing sub-module 126. One or more loan origination system programs are coupled to the loan selection sub-module 124. The loan selection sub-module accesses and displays a list of loan applications (borrower files) that the loan broker may want to submit to a specific function on the lender web site. Once the appropriate loan application file has been selected, the loan processing sub-module 126 performs the appropriate calculations and processing to extract, validate, format, and submit the loan application to the lender web site.

The loan origination system programs illustrated in FIG. 1B include Genesis 125, Contour 127, and Calyx 129, although other loan origination system programs are also possible. The clickloan module 123 interfaces to each LOS programs through direct data structure access, an application programming interface (API), or similar type of program adapter. Furthermore, each LOS program contains or is coupled to a respective data source 135, 137, and 139. Upon initiation by the broker, the clickloan API interfaces within the respective LOS programs operate to transfer data from the LOS program to the clickloan module 123 resident on the lender web site 122. This prevents the need for the broker to enter this information directly into the lender web site 122. In this manner, the relevant loan application is "pulled" from the LOS program to the lender web site. The integration within the lender's web site eliminates the need for the lender to implement or otherwise closely couple itself to the loan origination system server (e.g., loan broker computer 102). For the embodiment in which the clickloan module is configured to utilize an existing API, the pipeline information can be displayed in a format consistent with the LOS program. This allows the module to preserve the "look and feel" of the original LOS program.

In one embodiment of the present invention, the loan origination system programs of system 150 can be included within the loan broker desktop environment of the loan originator computer, or they may comprise remotely executed programs executed on the broker computer or a separate networked computer, e.g., server 116 of system 100. In general, the loan origination programs serve a loan origination screen to be accessed by borrowers over a network, and typically through a web browser interface. File templates, which serve as blank loan application forms, are then loaded and displayed to the borrower. These are loaded from a database of file templates that are stored either locally on the loan originator computer or on a remote storage device, such as data storage 110. Various file templates can be defined for different loan types, such as conventional loans, FHA loans, VA loans, and so on. After the borrower enters the relevant personal and loan information required by the file template and initial loan application form, a processing client executes an automatic data flow process to populate the same information in all of the corresponding fields in all other documents and forms processed by the system that are related to the loan application. This includes other related bank and government forms, as well as word processing documents, spreadsheets, and any other documents with fields that are linked to the original form or other defined that same as the original fields. If necessary, the processing client also automatically calculates relevant field data in any of the fields of the forms that require derivation or calculation. These can include fields that calculate interest rates for given borrower profile and loan period and amount, as well as cash flow or amortization schedules, among other calculations. Once the entry field information has been populated for all of the forms and documents, and the relevant calculations have been performed, the loan application documents are submitted by the loan originator to the appropriate lenders either directly or indirectly through the processing and submission server. Depending upon the interface between the lenders to the network and/or the processing and submission server, the loan information is input into the lender computer systems as seamlessly as possible. For example, if the interface between a lender and the network is web-based, such as the Freddie Mac Loan Prospector system, the information is populated directly into the lender web forms. This automated input and distribution system eliminates the need to fill out individual disparate loan application forms, and transmit the forms to the various broker and lender sites.

As illustrated in system 100 of FIG. 1A, the interface system between the lender computer 104 and the broker computer 102, referred to as the "clickloan" interface, serves to eliminate the complex loan file export function and manual form-filing process currently required on lending and vendor web sites. The clickloan interface is integrated into the lender's web site through clickloan module 114. This interface allows a borrower accessing the lender's web site through a normal web browser to identify and transfer a loan application and associated data to the lender computer in an efficient manner. For example, through a web browser, such an operation can be typically accomplished by the user in two mouse clicks.

Figure 2A:
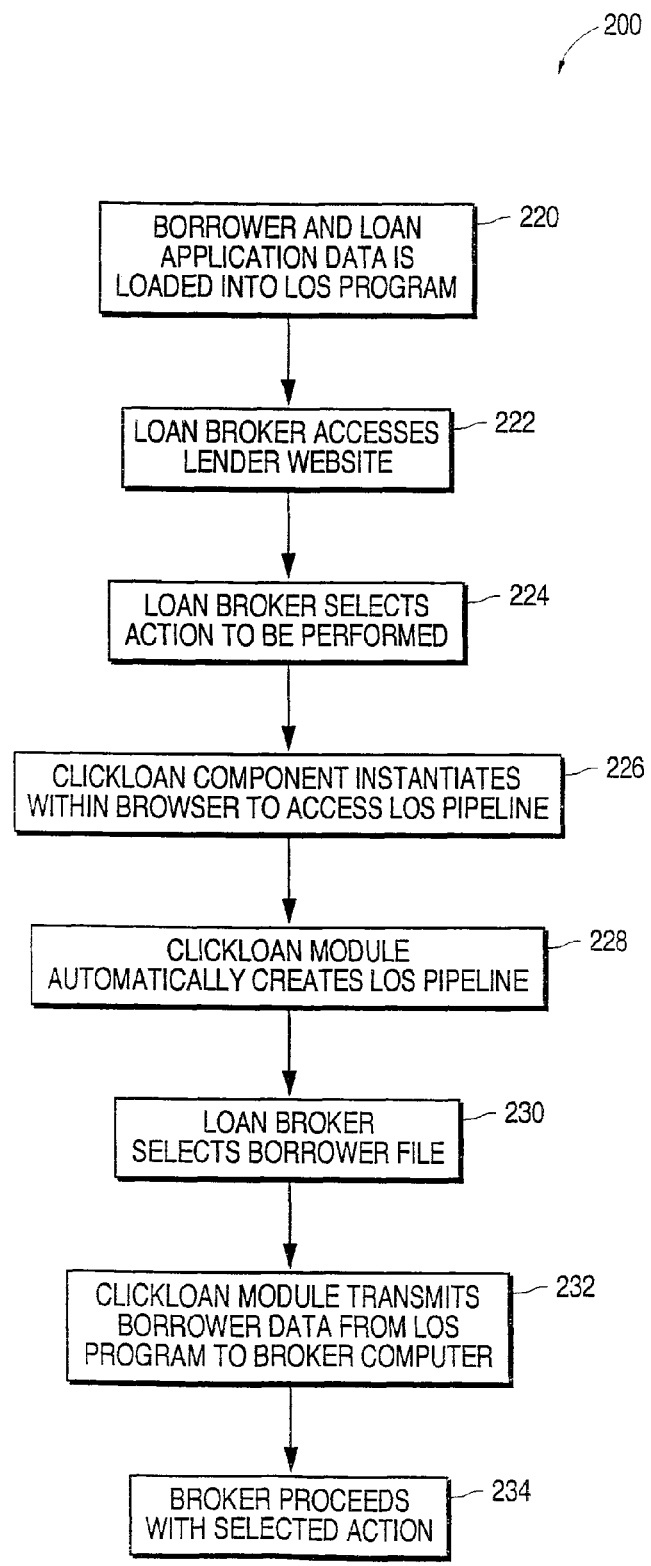
FIG. 2A is a flowchart that illustrates the general steps of processing a loan application through the system illustrated in FIG. 1A, according to a method of the present invention.

FIG. 2A is a flowchart that illustrates the general steps of processing a loan application through the system illustrated in FIG. 1A, according to a method of the present invention. As a preliminary step, it is assumed that the borrower and loan application data is loaded into the loan origination system program 108 that is executed by the loan broker computer 102, step 220. The loan broker accesses the web site of the particular lender that he is interested in, step 222. Typically, the lender web site provides a list or menu of operations that the broker can perform, such as obtaining a loan quote, pre-qualifying a borrower, and so on. In step 224, the broker selects the action to be performed. For operations that require loan and/or borrower data, the clickloan module 114 instantiates within the browser to access the LOS pipeline, step 226. The clickloan module then creates an instantiation of the loan application object on the desktop of the loan broker computer 102 through the broker web browser 106. In this step, 226, the clickloan component checks the software configuration of the broker computer 102 and determines the location of the pipeline in the memory, typically the hard disk location, of the broker computer, and displays the pipeline through the web page displayed by web browser 106. This process is referred to as an "instantiation" of the clickloan component.

After the object is created, the clickloan module automatically creates an LOS pipeline listing the various borrowers and loan applications that are active within the loan origination system, step 228. In general, the displayed pipeline lists all of the pending loan applications for all of the borrowers being processed by the LOS program 108 in the broker computer 102. Alternatively, filters or pre-processing flags in which the LOS is actively running for only a particular borrower is being processed can allow the pipeline to display pending loan applications for only a particular borrower. Other filters can be defined to allow display of pipelines for specific applications, such as time-based, status-based, or similar criteria. From the pipeline, the broker may select a particular borrower file, step 230. The clickloan module transmits the borrower data from the loan origination system to the broker desktop through the web interface, step 232. Once the data is populated within the instantiation of the application object that is created on the broker desktop, the selected operation is executed, step 234.

Figure 2B:
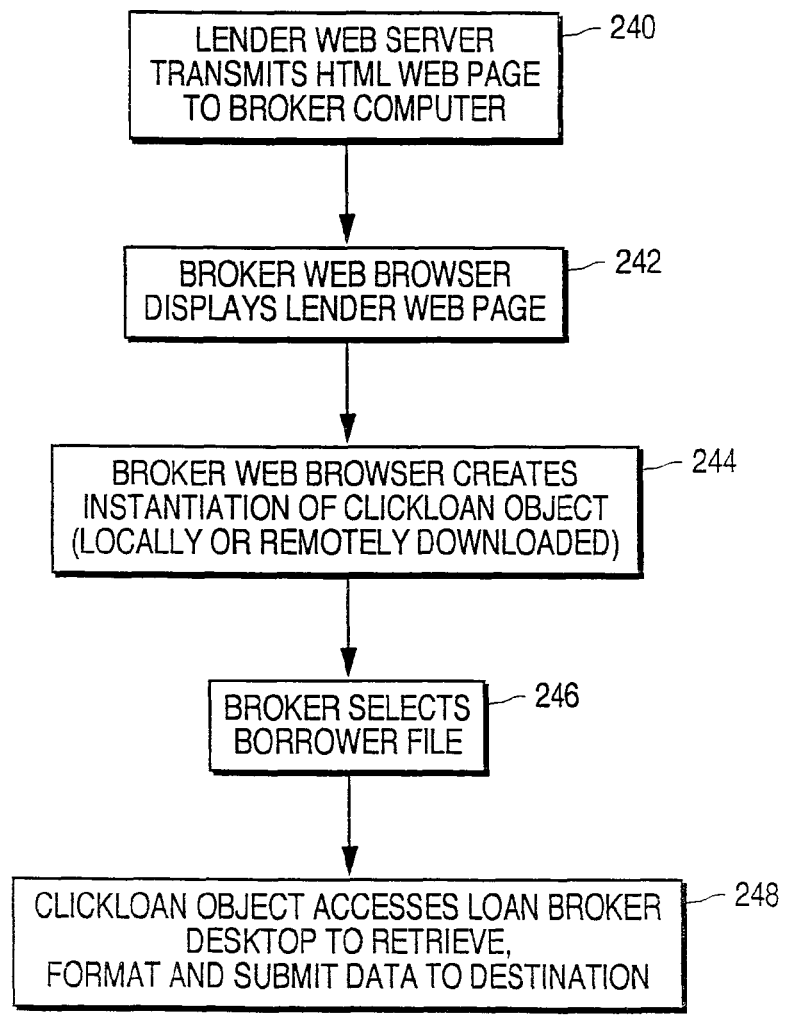
FIG. 2B is a flowchart that illustrates the transaction steps between the web server process of the lender computer, and the web client process of the broker computer for the system illustrated in FIG. 1A, according to a method of the present invention.

As is illustrated in FIG. 2A, the clickloan module 114 essentially creates an executable instance of the application on the broker computer using data from the loan origination system program. The creation of the object instance on the broker computer is implemented, in one embodiment, through the web-based client/server relationship between the broker computer 102 and the lender computer 104. FIG. 2B is a flowchart that illustrates the transaction steps between the web server process of the lender computer, and the web client process of the broker computer for the system illustrated in FIG. 1A, according to a method of the present invention. Upon access of the lender web page by the broker, the lender web server 112 transmits the HTML data comprising the web page to the broker computer 102, step 240. The web browser process 106 on the broker computer 102 then displays the lender web page, step 242. The broker web browser 106 creates an instantiation of the clickloan object for the loan application, step 244. The data comprising the object can be either stored locally on the broker computer 102, or can be remotely downloaded from a separate server computer 116. Once the pipeline is created and displayed, the broker selects the borrower file, step 246. The clickloan object accesses the loan broker desktop to retrieve, format, and submit the LOS data to the broker computer, step 248.

As discussed above, the lender web site is typically accessed by a loan broker or originator using a web browser program. FIG. 3B is an exemplary web page for a lender Indy Mac™ Bank, according to one embodiment of the present invention. The web page 300 includes a display area 302, which allows the user to specify one or more actions to perform. These include submitting an application for a new loan, locking a rate for a new loan, viewing market conditions, and other such actions. Also provided is a display area 304 that provides access to loan origination system programs that allows for the import of data from various LOS programs that might be available. The lender web page 300 provides a simple and familiar interface for the user to the LOS programs linked to the lender. As loan applications are processed through the lender web site, information and relevant data are pulled from the LOS programs into the web site for processing and display to the user. The main display area 305 displays data entry points and information related to the action that is selected by the broker.

Figure 3A:
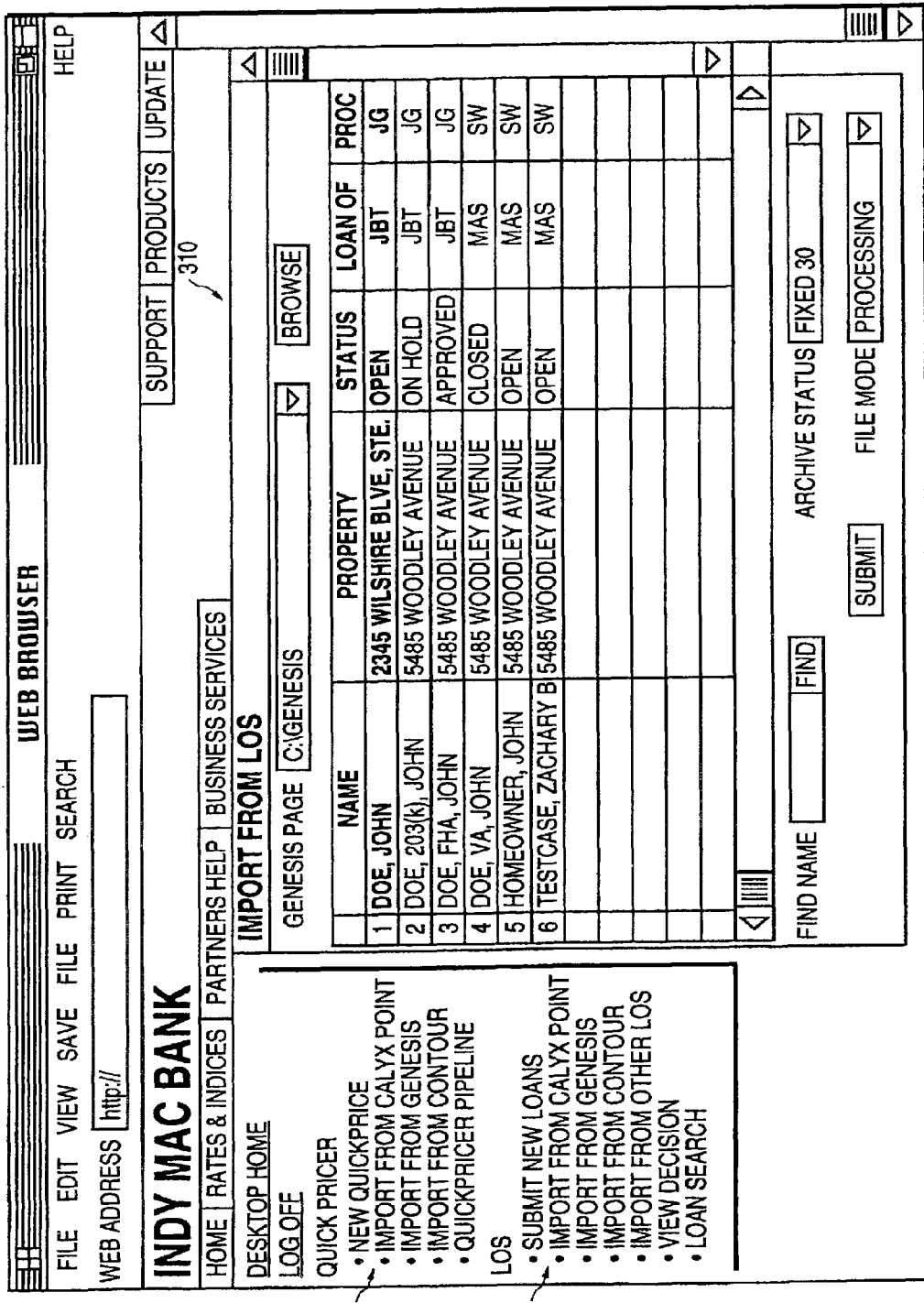
FIG. 3A is an exemplary web page for a lender web site displaying a loan pipeline, according to one embodiment of the present invention.

Once in the lender web site, the broker can select a particular action, create a new loan application, or access an existing loan application. For operations involving existing applications, the broker specifies data to be imported from the appropriate LOS program using option buttons 304. Upon importation of the LOS data, the clickloan module automatically creates and displays a pipeline of present loan applications. Such a pipeline is illustrated in FIG. 3A in the main display area 310. In one embodiment of the present invention, the pipeline is displayed in a spreadsheet format listing the borrower name, loan application status, loan officer/processor, and property (in the mortgage). Each entry in the spreadsheet pipeline is a hypertext link that provides access to further loan application data pertaining to the borrower. Thus, if the broker clicks on a borrower's name, an object comprising the loan application is created, and the relevant data is downloaded from the LOS program.

FIG. 3B illustrates the loan application page 305 for a particular borrower. The display area 305 displays certain items of information, such as loan number, borrower data, loan information, and so on. The data for each of the fields is automatically transferred from the LOS program by the clickloan module. FIG. 3B illustrates an instance of the loan application object that allows the broker to submit the loan for the borrower. Once the data is imported, a simple click operation is all that is required to submit the loan for approval. In this case, the broker did not need to enter any additional data, as the clickloan module caused the data to be automatically transmitted from the LOS program.

The clickloan interface is configured to be used for any function that requires data transfer including pre-qualification, submission, rate locking, settlement service ordering, or any similar type of operation. It can pass any data contained in the loan broker computer 102, regardless of the type of document format (e.g., 1003, 1008, GFE, or other type of form). In one embodiment, the clickloan module and interface is integrated into the lender's web site as a self-contained component and provides access to the loan application management program, e.g., Genesis, Contour, and Calyx Point data being run on the loan originator computer.

In one embodiment, the clickloan interface is hosted by a dedicated process within the processing and submission server. For this embodiment, the clickloan module 114 can be implemented as Microsoft Active X module that is downloaded one time to the lender web site hosting computer. There is a separate component for each LOS hosted on the loan broker computer 102. The clickloan module 114 displays the loan originator pipeline (loan selection panel) by reading the internal index and borrower file or database structure of each loan originator, and packages them according to the lender's data and format requirements. A secure Internet protocol HTTPS is then used by the clickloan module to communicate with the lender's secure web server 112 as well as the broker computer 102.

The integration of the clickloan module on a lender site is accomplished through a basic three-step process. First the module determines the data content and format utilized by the lender. References to the clickloan module components are then incorporated on the lender's HTML pages. Data is then received in a standard HTTPS Post request. Two-way communication between the lender web site and the loan originator is achieved via the web interface. Lender 104 can post data back to the broker computer 102.

In one embodiment of the present invention, the clickloan module 114 is configured to support various formats, including FNMA 3.0 and XML, or simply a list of name value pairs. On-demand installation and automatic update of the ActiveX components is also provided. The dynamic server processing architecture illustrated in FIG. 1A allows the client side (clickloan module) process to diversify traffic to the broker computer, with all data mapping to the supported loan origination system performed locally. The web page displayed to the broker can be configured to include a series of simple HTML links that provide access to the lender web pages.

Figure 4:
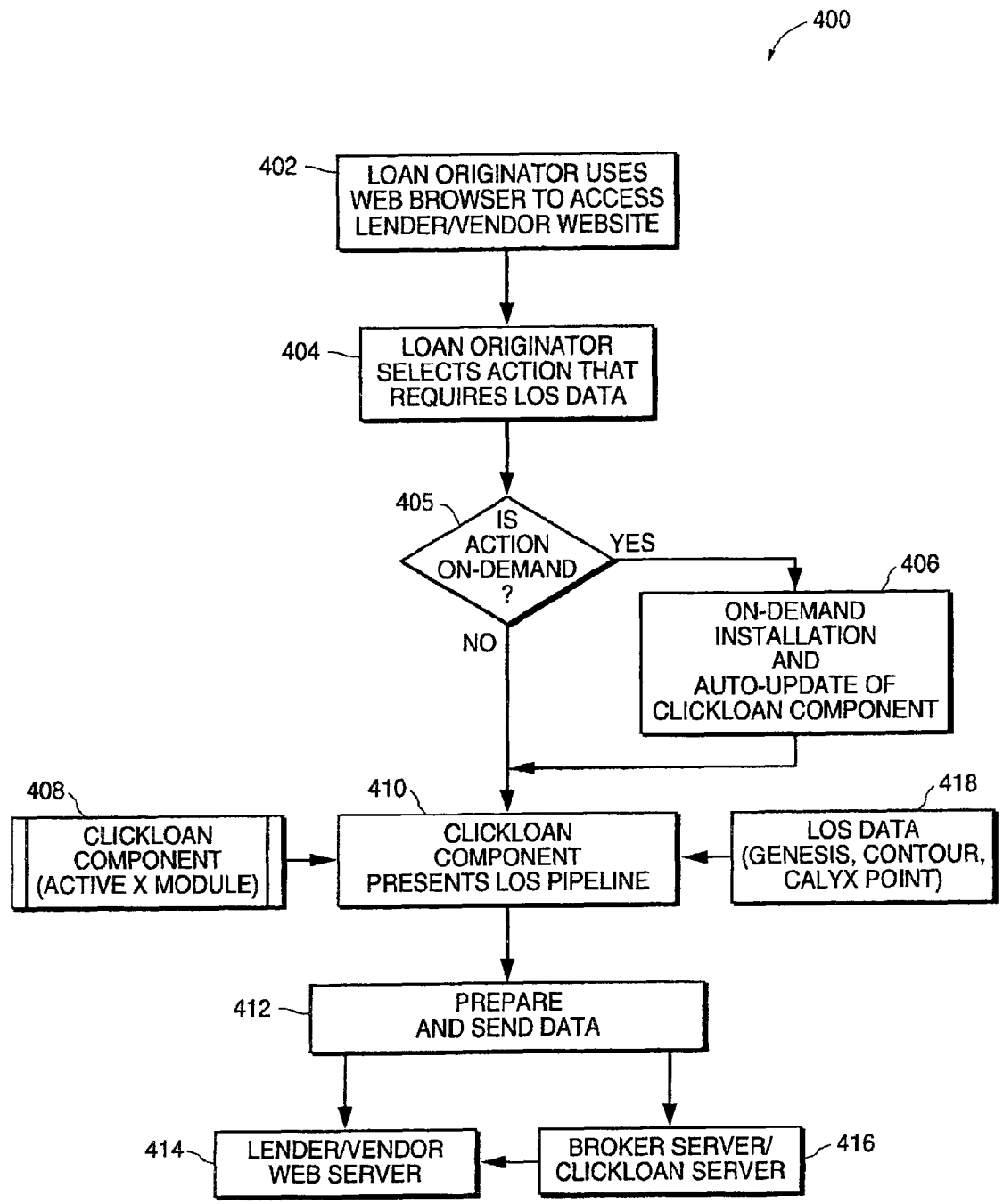
FIG. 4 is a flowchart illustrating the steps of providing an interface between loan origination servers and lender computers, according to a method of the present invention.

FIG. 4 is a flow diagram that illustrates an implementation of the clickloan interface, according to one embodiment of the present invention. In step 402 the loan originator (broker) accesses the lender web site 130 through a resident web browser program. The broker selects an action that requires loan originator data, step 404. This is typically accomplished by the broker clicking on a loan application selection button on the loan origination system web site, or accessing his or her account information through the loan origination system site. If the action is an "on-demand" action, as determined in step 405, an on-demand installation and auto-update of the clickloan component 132 on the lender's site is performed, step 406. The clickloan component 408 then presents a pipeline to the broker, step 410. The loan product data comprising the pipeline is provided by the loan origination system programs 118, as shown in step 418.

Data to be used in the loan application process, such as data relating to the borrower, is provided by the processing and submission server, step 416. In step 412, the data is prepared and transmitted by the loan originator to the lender web server. This data can either be sent directly to the lender web server, as shown in step 414, or it can be transmitted indirectly through a clickloan server process within the processing and submission server 102, as shown in step 416.

Figure 5:
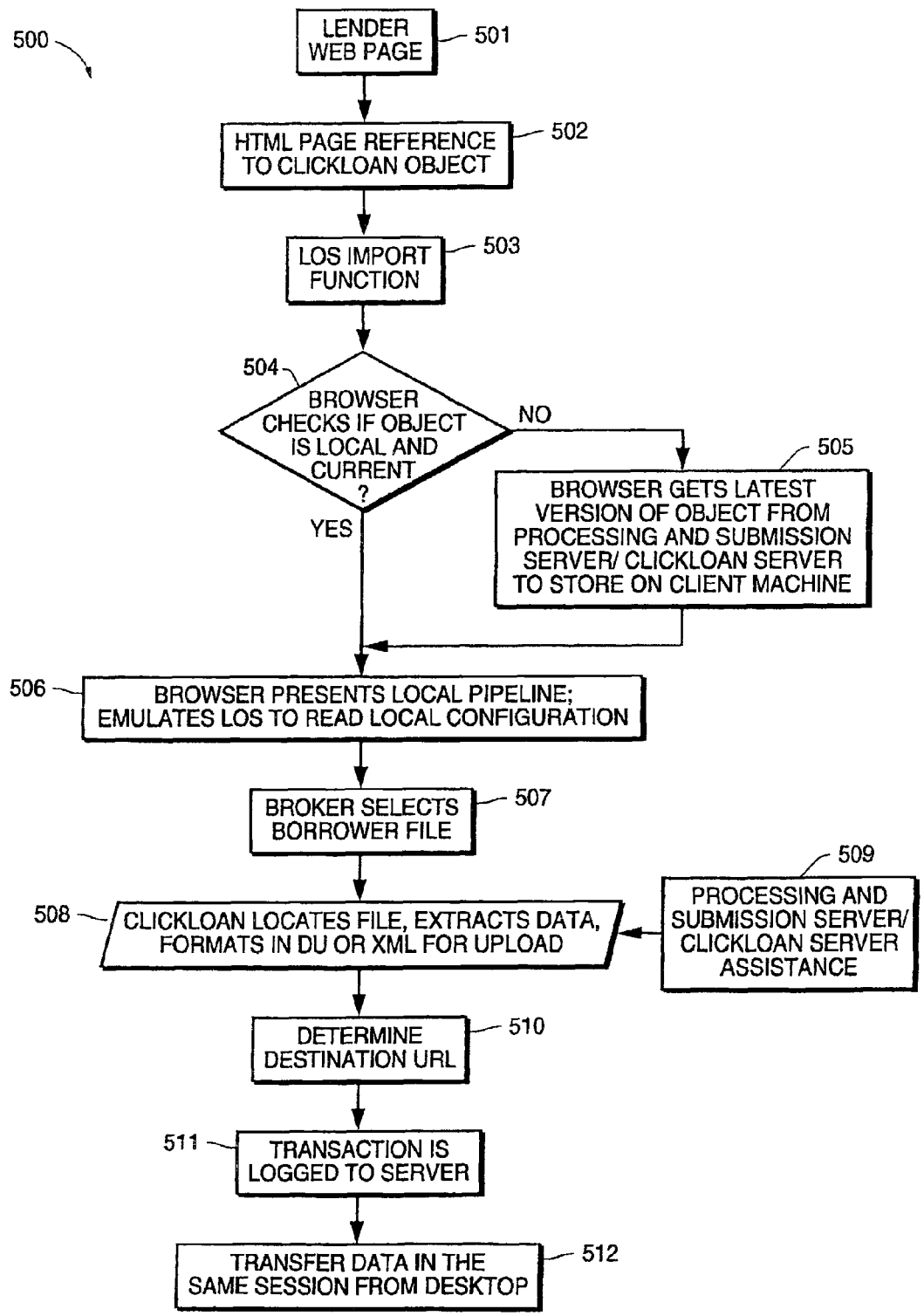
FIG. 5 is a flowchart illustrating the steps of providing an interface between loan origination servers and lender computers according to the steps illustrated in FIG. 4.

FIG. 5 represents a more detailed flowchart illustrating the steps of providing an interface between loan origination servers and lender computers according to the steps illustrated in FIG. 4. In step 502, a lender web page is referenced to a clickloan object processed by the clickloan module 118. This object is compiled to form a loan origination service import page 503. In step 504, the browser checks if the object is local and current. If not, the browser downloads the late version of the object from the clickloan server process within the processing and submission server 102, and stores the object on the LOS client, step 505. The process then proceeds from step 506 in which the web browser preserves a local pipeline and emulates the loan origination system to read the local configuration. In step 507, the borrower selects the browser file corresponding to the loan application.

In step 508 the clickloan module 118 locates the loan application file, extracts the user input and calculated data, and formats the data appropriately for upload to the lender. This step may be facilitated by the processing and submission server, such as for data entry, entry field calculations, formatting operations, and/or file transmission to the lender. Once the data is formatted, the destination address, typically a web page uniform resource locator (URL) address, of the lender web site is determined, step 510. The transaction is then logged to the processing and submission server 102, step 511. Data from the same application and submission session is also transferred from the desktop to the processing and submission server, step 512.

As illustrated in FIG. 1B, the clickloan module is integrated within or otherwise closely coupled to the lender (or vendor) web site. A user accessing the lender web site is provided a gateway to the loan origination software program through the clickloan interface.

The first time a user (typically a loan originator) visits the wholesale lender's or vendor's web site, he or she indicates the installed LOS, which loads the corresponding clickloan module onto the user's hard drive. The clickloan module detects all installments of the selected LOS and each installation director is added to an "LOS Path" combo box. Alternatively, the user can select the appropriate LOS. The user selects a path, and the file selection panel for the loans located at that path is then displayed. The control is designed to default to the most recently selected path, and the next time the module is loaded, it will activate that path. Every time another path, folder, or mode is selected, the clickloan module automatically updates the file selection panel to display the loans for the selected path.

In some situations the LOS package has been installed on the network from one computer, but the computer on which the clickloan module is loaded has not done workstation installation. In this case the registry and initialization (INI) files will not contain any record of installation paths. As a result, the combo box with path list will be empty and the clickloan control will display a message stating that the particular LOS installation has not been detected. In this case, the user must type the path to the network installation into the Path field. The clickloan module will determine the existence of the directory and the LOS exact name of the installation path. A "browse" button can also be used to locate the installation directory. Once clickloan finds the LOS, it will immediately display the file selection panel.

After the first visit to the wholesale lender's web site, the user will typically click the "Submit Loan from LOS" or a similarly labeled icon to submit a loan application. The system will create a pipeline report indicating all of the loans currently in process. To submit a loan, the user will highlight the loan and press the submit button at the bottom of the files selection panel, or simply double-click on the loan icon.

In one embodiment, the loan is exported to DU version 3 format, and an XML envelope is created. The DU3 file is put into "CDATA" section under <LoanData> tag. All the assigned properties (mandatory and optional) plus Transaction ID are listed under <property> tag. The format for a sample XML file is as follows:

```
<?xml version = "1.0"?>
  <ClickLoan_Envelope>
    <Properties>
      <VendorID>234375/<Vendor ID>
      <ActionType>1<Action Type>
      <UserID>1234567</UserID>
      <IncompleteDataAction>2</Incomplete Data Action>
      <FrameName> SomeFrame</FrameName>
      <TransactionID> CL_{6567643E-AD19-4AEC-BACD
         741E83A85576} </TransactionID>
    </Properties>
    <LoanData Format = "FNMA30">
      <![CDATA
      DU3 data goes here
      ]]>
    </LoanData>
  </ClickLoan_Envelope>
```

Once the XML file is created, it is sent to the URL, mapped to the particular Vendor ID and Action Type. As a response, the user receives an HTML page displaying the status of the request or links directing them further.

In order to integrate the clickloan module in the lender web site, the lender inserts the clickloan control into a web page using the <OBJECT> tag in the HTML page and referring to the ClassID of clickloan control.

The codebase attribute indicates where the CAB file is located. It is important to note that the version number has to be specified in the CODEBASE attribute, and it should correspond to the version of the control. Every time the web browser (e.g., Microsoft Internet Explorer) navigates to the Web page, the version of the currently installed component is compared to the version specified in codebase attribute. If codebase version is higher, the new CAB file is downloaded and installed. Otherwise already installed clickloan control is loaded. It is therefore generally necessary to update the version in codebase with the current version number of the clickloan control.

In one embodiment, the clickloan CAB files are hosted on the loan origination system server 102. All the vendors are provided with URLs for these files, and the codebase attributes should point to those URLs.

Once the clickloan module has been inserted into a web page, there are several properties that need to be set by the hosting web page. To set these properties, a set properties (SetProperties(BSTR PropName, BSTR PropValue)) function is made available to be used within the script tag of the web page. This function is called as a method of clickloan object using the name specified by ID attribute of object tag.

The following mandatory properties are set by the user once the control has been inserted: vendor identifier, action type, user identifier, incomplete data action, and frame name. The vendor identifier (VendorID) is the unique ID assigned by the loan broker computer 102 to every vendor. The action type (ActionType) is an integer specifying what action is being taken by that web page. This integer will map to the URL to which the date is to be submitted. For example, a loan submission can be assigned action type 1, and loan registration can be assigned type 2. The vendor then specifies that for action type 1, the data is to be posted to one URL and for action type 2 the data is submitted to a different URL. The user identifier (UserID) is the ID used to login to the lender web site.

The incomplete data action (IncompleteDataAction) variable tells the clickloan module what to do if the loan file being uploaded has missing data according to DU file format requirements. If the property is set to 0, the user is allowed to continue uploading the file despite some missing data. This is the default, and in this mode the file would be checked, and if any missing data were found, a list would be displayed to the user to help them locate the missing fields. The user will have the option to continue the submission or cancel it. If this property is set to 1, the user will see a list of missing fields, however, there is no option for uploading incomplete files. If the property is set to 2, incomplete data warning and the list of missing fields will be ignored, and submission of the data will be allowed. Different loan origination system programs 118 may have different default settings for this parameter. The frame name (FrameName) parameter specifies the name of the frame to which the resulting page should be targeted.

Besides the listed properties, other properties (XML nodes) can be added to the XML file. For example PropName and PropValue can be assigned any value that the user specifies. All these properties will be posted to the lender site. In the XML structure, all these properties will go under <Properties> node under the root element.

A sample web page program code for hosting clickloan control within a lender web page is provided as follows.

```
<html>
<head>
<meta http-equiv = "Content-Type"
content = "text/html; charset = iso-8859-1">
<meta name = "GENERATOR" content = "Microsoft FrontPage Express 2.0">
<title>ActiveX Text Page</title>
</head>
<body bgcolor = "#FFFFFF">
<p>
<center>
<object id = "ClickLoan"
name = "Genesis ClickLoan Control"
classid + "clsid:05842B)C-271B-412F-958F-D1A8F6CAD937" border = "0"
codebase =
http://www.clickloand.com/EMActiveX/GenClickLoan.cab#version = 1,0,0,2
width = "705" height = "425">
</object>
</center>
</p>
<script language = "VBScript">
ClickLoan. SetProperties "VendorID", "00000001"
ClickLoan.SetProperties "ActionType", "1"
ClickLoan.SetProperties "UserID", "1234567"
ClickLoan.SetProperties "IncompleteDataAction", "2"
ClickLoan.SetProperties "FrameName", "SomeFrame"
</script>
<font size="-2" face = "Arial,Helvetica,Verdana">
<center>© Copyright 2001
<a href = "http://www.genesis2000.com">Ellie Mae, Inc.</a>
All Rights Reserved.
</center>
</font>
</body>
</html>
```

The above example illustrated the integration of the clickloan module within the Genesis LOS program. In one embodiment, the different clickloan modules for each LOS are specified inside the OBJECT tag. For example, sample code for embedding the clickloan module into Calyx Point and Contour is as follows:

```
Contour
<object id = "ClickLoan"
name = "Contour ClickLoan Control"
classid = clsid:56BCB794-783A-48F1-A4C2-110F32371830" border = "0"
codebase =
"http://www.clickloan.com/EMActiveX/GenClockLoan.cab#version+1,0,0,2"
width="640" height="425">
</object>
Calyx Point
<object id = "ClickLoan"
name = "Point ClickLoan Control"
classid + "clsid:DF05D910-DC8E-403A-93B0-5C866F3200D1" border = "0"
codebase =
http://www.clickloan.com/EMActiveX/GenClickLoan.cab#version =1,0,0,2
width = "570" height = "400">
</object>
```

Figure 6:
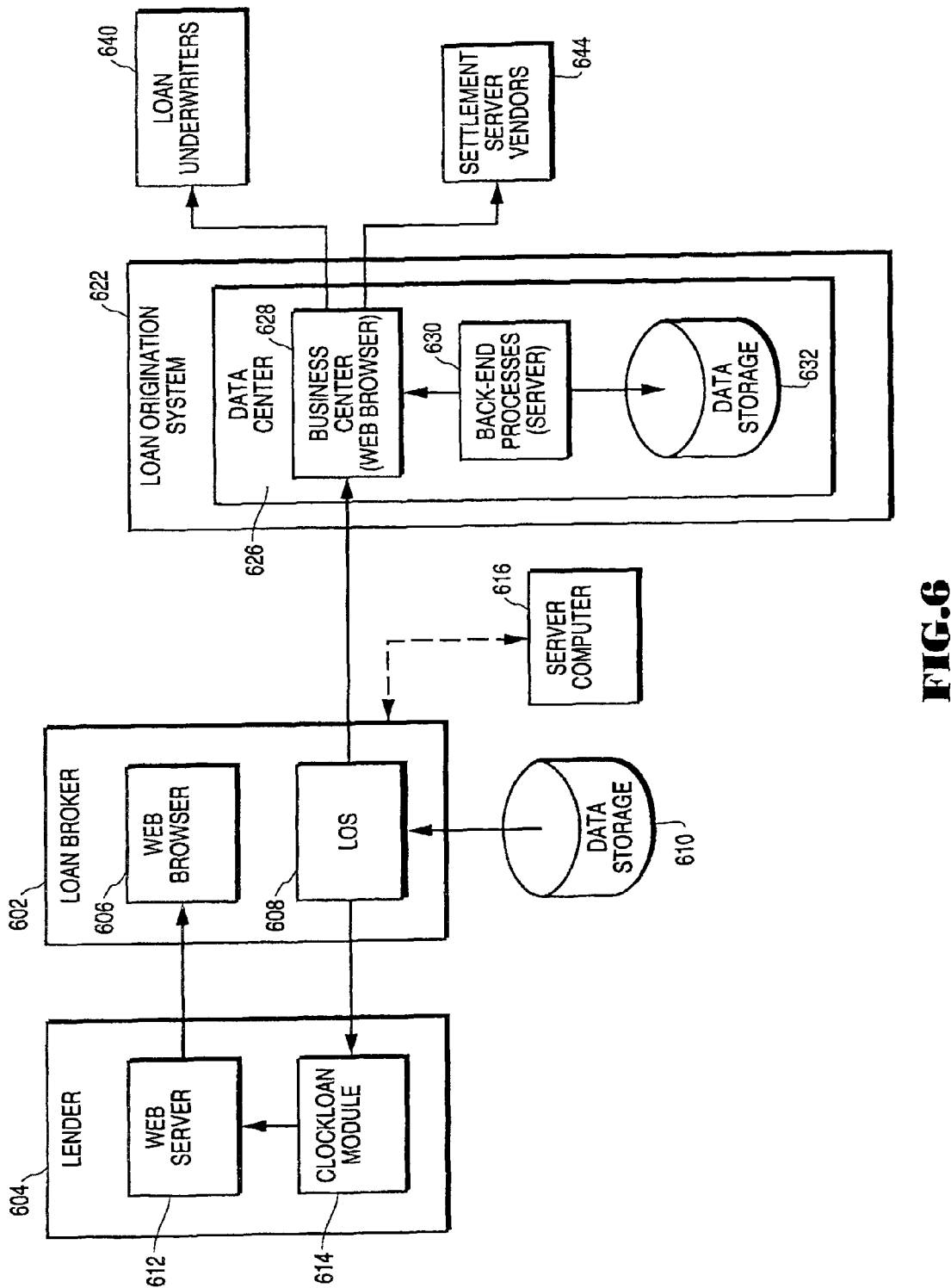
FIG. 6 illustrates a network that implements a loan processing software system, and that includes both a web-based loan origination system interface and a server-implemented loan application system, according to one embodiment of the present invention.

In one embodiment of the present invention, the loan origination system interface module for interfacing a lender computer to LOS programs on a broker computer can be implemented in conjunction with a server based desktop based loan application processing and submission server. Such a system is described in co-pending U.S. application Ser. No. 10/172,844, entitled "Online System for Fulfilling Loan Applications From Loan Originators." FIG. 6 illustrates an exemplary network system for processing loan applications, according to this alternative embodiment of the present invention. As illustrated in FIG. 6, the LOS program or programs resident on the broker computer 602 are also coupled to a loan origination system computer 622. This computer executes several program modules that manage the loan origination process and comprise the processing and submission system. These can include a business center process 628, one or more back-end processes 630, and a data storage facility 632. In one embodiment, the business center 628 contains a network interface that provides access between the loan origination system program and other entities. For the embodiment in which the network comprises the Internet, the interface may be a web-based interface. In this case, the business center 628 includes a web browser client process 606 executed on the loan broker computer. The back-end processes 630 comprise the processing and submission system servers that provide downloadable program modules to the loan origination program and/or perform calculations for the loan origination program. The data storage facility 632 stores various data related to the lenders and users within the system.

The business center process 628 within the data center 626 includes the software module comprising a processing and submission system that implements business and processing logic modules for receiving loan application information from a borrower (such as 1003 data for mortgage loans), storing data related to the borrower, providing interfaces to processes utilized by lenders and other third parties that fulfill and settle the loan. In one embodiment, the data stored by the data center is used by the loan origination system programs 608 and provided to the broker through the lender web site 612 for processing and display.

As illustrated in FIG. 6, the loan broker computer 602 is coupled through the business center process 628 to loan underwriters 648, and one or more settlement service vendors 644. These entities perform the function of fulfilling and settling the loan application. These entities generally access the loan origination system program of the broker computer through the web browser interface of the business center 628. The business center also provides facilities to set up storefront type interfaces for lenders to customize their offerings, and provides an information portal for brokers. Such a portal and storefront interface may be utilized by the lenders and/or vendors to generate and maintain a web site presence on the Internet, such as through lender web site 612.

One or more of the loan underwriters 640 reviews the loan application and approves or denies the application. One example of a mortgage loan underwriter is the Fannie Mae company, which does not itself provide loan funds but works with lenders to assure that the funds are available. Lenders 604 are typically banks, savings and loans, or other financial institutions that provide the loan funds. The settlement service vendors provide services and information required to close the loan. Such vendors include appraisers, credit reporting agencies, document preparers, flood certification agencies, and the like. Other third party entities that may be interfaced to the broker computer may include loan servicers who collect monthly payments from the borrower, and other similar loan process companies. The lenders and vendors may maintain web sites as a point of contact for brokers over the Internet.

The business center module 628 of the loan originator computer 622 accesses one or more loan origination system programs 608. The loan origination software programs 608 utilized by the loan broker can be a proprietary system or a commercially available system. Examples of present commercially available loan origination system programs include Genesis™, Contour™, Calyx Point™, and Byte™, as described previously, among other similar LOS programs. Alternatively, the loan broker may utilize a standard Internet web site to interface with the borrower and provide some degree of loan origination software functionality.

Operation of the loan origination system 622 for a loan application process initiated by broker 602 is described in the aforementioned co-pending U.S. application Ser. No. 10/172,844, entitled "Online System for Fulfilling Loan Applications From Loan Originators," which is hereby incorporated in its entirety by reference.

Although embodiments and examples of the present invention have been described with reference to specific programming languages (such as HTML) and structures, it should be noted that alternative embodiments may be implemented using different languages and structures. Furthermore, although embodiments of the present invention have been described with reference to a network implementation comprising the Internet and Internet-related web browsing and web serving technologies, it should be noted that alternative embodiments of the present invention can be implemented on many other types of networks and network protocols, such as proprietary protocols for local area networks, wide area networks, and any combination thereof.

The present invention has been described primarily in relation to loan applications for personal home mortgage loans. It should be noted, however, that many other types of loans can be processed through the embodiments described herein, such as commercial loans, any type of personal loan, home equity loans, and the like.

In the foregoing, a user interface system for processing and submitting loan applications through a network of loan originators and lender computer systems has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system for processing and submitting loan application data over a computer network, the system comprising:
a vendor computer including a web server operable to serve at least one web page providing access to services provided by a vendor operating the vendor computer, wherein the web page is accessible by a user through a web browser executed on a broker computer;
the broker computer configured to execute a desktop loan origination computer program for storing and processing loan application data regarding one or more borrowers; and
an interface module initiated from the at least one web page served by the vendor computer, the interface module configured to
extract loan application data associated with, the desktop loan origination computer program upon the user's initiation of a loan submission function presented to the user on the at least one web page served by the vendor computer,
display, on the at least one web page served by the vendor computer, a list of loan applications in an interface that is consistent with the desktop loan origination computer program associated with the broker computer, so that the user is presented with a list of loan applications for further processing on the vendor computer, when the user selects a loan application from the list, change the format of the loan application data from a format in which the loan application data was stored to a format compatible with the vendor computer, and retrieve loan application data for the selected loan application from the broker computer.

2. The system of claim 1, wherein the interface module is further configured to extract, validate, format, and deliver a loan application package utilizing the loan application data from the broker computer to the vendor through the at least one web page served by the vendor computer.

3. The system of claim 1, wherein the interface module is further configured to read internal index, user file information, database structure information, or any combination thereof from the broker computer loan origination computer program and adapt the data contained therein to a format compatible with that required by the vendor computer.

4. The system of claim 2, wherein the loan application package comprises a document type selected from the group consisting of word processing documents, commercially formatted loan application documents, government specified loan application documents, spreadsheet program documents, or combinations thereof.

5. The system of claim 4, wherein the loan application package comprises data conforming with a loan selected from the group consisting of a federal housing authority loan, a veterans administration loan, a home equity loan, a home refinancing loan, a commercial loan, or a conventional mortgage loan.

6. The system of claim 1, wherein the interface module is logically coupled to the loan origination computer program through direct data structure access.

7. The system of claim 1, wherein the interface module is logically coupled to the loan origination computer program resident on the broker computer through an application programming interface.

8. The system of claim 1, wherein the interface module is further configured to execute a logging process on the broker computer to store, on a memory coupled to the broker computer or on a memory of an outside server, each user initiated access to the at least one web page served by the vendor computer.

9. The system of claim 1, wherein the interface module is stored on the vendor computer or a separate server connected to the Internet as a downloadable program object served by a server computer.

10. The system of claim 1, wherein the network couples the broker computer and the vendor computer to one or more third party server computers operated by at least one of a group consisting of loan underwriters; correspondent vendors, or loan settlement service vendors.

11. A computer program product for processing and submitting loan application data over a web-based computer network including at least a vendor computer and a broker computer executing a loan origination computer program, the computer program product encoded in a computer readable medium and including instructions to:

extract from a broker computer loan application data for one or more borrowers stored on the broker computer including:

retrieving identification information of the loan applications from the broker computer;

displaying on the broker computer a list of loan applications in an interface that is consistent with the loan origination computer program associated with the broker computer;

in response to command input from the broker computer selecting one or more loan applications from the list of loan applications, and re-formatting loan application data for the selected one or more loan applications stored on the broker computer to a format compatible with that required by the vendor computer; and retrieving user loan application data from the broker computer.

12. The computer program product of claim 11, wherein the reformatted loan application data is formatted as a loan application document.

13. The computer program product of claim 12, wherein the on-line loan application document comprises a document type selected from the group consisting of word processing documents, commercially formatted loan application documents, government specified loan application documents, spreadsheet program documents, or combinations thereof.

14. The computer program product of claim 13, wherein the reformatted loan application comprises data conforming with a loan selected from the group consisting of a federal housing authority loan, a veterans administration loan, a home equity loan, a home refinancing loan, a commercial loan, or a conventional mortgage loan.

15. A method comprising:

providing to a broker computer a web page from a vendor web site served by a web server executed on a vendor computer, wherein the web page is accessible from a web browser application executed on the broker computer;

upon receiving a selection from the broker computer of a loan submission function on the web page, displaying at the broker computer within the web page a list of loan applications in an interface that is consistent with a desktop loan origination computer program associated with the broker computer;

upon receiving a selection command from the broker computer regarding selection of at least one loan application from the list of loan applications, changing the format of the loan application data necessary for the selected loan submission function from the format in which it was stored in the broker computer to a format compatible with the vendor computer; and retrieving loan application data for the selected at least one loan application from the broker computer.

16. The method of claim 15, wherein the method further comprises:

emulating a format of data storage and presentation for the loan application information according to a loan origination computer program associated with the broker computer.

17. The method of claim 16, further comprising:

determining a format and content of data comprising the loan application information; and conforming the format and content of the loan application data to a format and content compatible with interface requirements of the vendor computer.

18. The method of claim 17, wherein the loan application information includes on-line loan application documents comprising a document type selected from the group consisting of word processing documents, commercially formatted loan application documents, government specified loan application documents, spreadsheet program documents, or combinations thereof.

19. The method of claim 17, wherein the loan application comprises data conforming with a loan selected from the group consisting of a federal housing authority loan, a veterans administration loan, a home equity loan, a home refinancing loan, a commercial loan, or a conventional mortgage loan.

20. A method comprising:
using a web browser application executed on a broker computer to access at least one web page from a vendor web site served by a web server executed on a vendor computer;
selecting at least one loan submission function on the at least one web page to initiate the execution of an executable object;
displaying a list of loan applications at the broker computer obtained by the executable object from identification information retrieved from the broker computer on the at least one web page from the vendor computer in a format consistent with a broker computer loan origination computer program; and
selecting at least one loan application from the list of loan applications including retrieving loan application data associated with the selected loan application from the broker computer and providing the loan application data to the vendor computer.

21. The method of claim 20, wherein the selecting at least one loan submission function further includes downloading the executable object to the broker computer upon the first initiation of the executable object.

22. The method of claim 20, wherein the executable object is stored on the broker computer.

23. The method of claim 20, wherein the vendor computer is selected from the group consisting of a vendor computer, a partner computer, a lender computer, an associate processor of data, or combinations thereof.

24. The method of claim 20, wherein the identification information and the compatible data format information are included in the executable object.

25. The method of claim 20, wherein retrieving loan application data further comprises:
receiving user input regarding a loan application to be submitted to the vendor computer;
locating data regarding the loan application in the loan origination system; and
delivering the located data to the vendor computer.

26. The method of claim 20, wherein prior to displaying the method further includes:
emulating a format of data storage and presentation for the loan application information;
determining a format and content of data comprising the loan application information;
reading an internal index referencing the data comprising the loan application information;
determining a database structure of the loan application information as it is stored in the broker computer; and
conforming the format and content of the data to a format and content compatible with the vendor computer.

27. The method of claim 26, wherein the database structure includes data selected from the group consisting of a data file, an index file, or a combination thereof.

28. The method of claim 26, wherein the loan application information includes on-line loan application documents comprising a document type selected from the group consisting of word processing documents, commercially formatted loan application documents, government specified loan application documents, spreadsheet program documents, or combinations thereof.

29. The method of claim 26, wherein the loan application comprises data conforming with a loan selected from the group consisting of a federal housing authority loan, a veterans administration loan, a home equity loan, a home refinancing loan, a commercial loan, or a conventional mortgage loan.

30. The method of claim 17, further comprising:
reading an internal index referencing the data comprising the loan application information; and
determining a database structure of the loan application information as it is stored in the broker computer.

31. A method comprising:
providing to a broker computer a web page from a vendor web site serve by a web server executed on a vendor computer, wherein the web page is accessible from a web browser application executed on the broker computer;
responsive each time to a selection from the broker computer of a loan submission function on the web page, displaying at the broker computer within the web page a list of loan applications;
upon receiving a selection command from the broker computer regarding selection of at least one loan application from the list of loan applications, changing the format of the loan application data necessary for the selected loan submission function from the format in which it was stored in the broker computer to a format compatible with the vendor computer; and
retrieving loan application data for the selected at least one loan application from the broker computer.

* * * * *